S. McCORMICK.
Plow.
4325X
Patented Jan. 28. 1826.
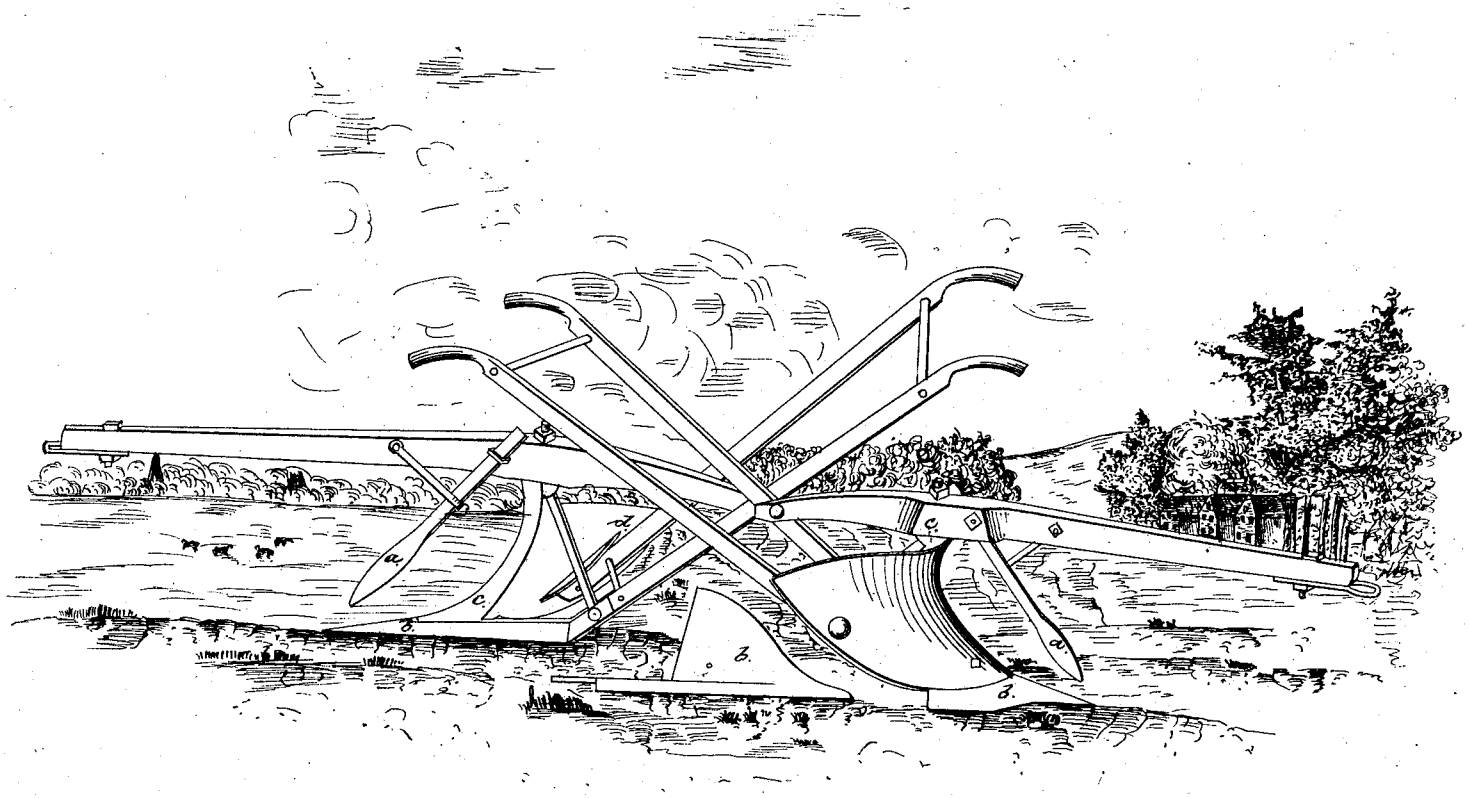
N. PETERS, PHOTO-LITHOGRAPHER, WASHINGTON, D. C.

4325X

UNITED STATES PATENT OFFICE.

STEPHEN McCORMICK, OF FAUQUIER COUNTY, VIRGINIA.

IMPROVEMENT IN PLOWS.

Specification forming part of Letters Patent dated January 28, 1826.

*To all whom it may concern:*

Be it known that I, STEPHEN McCORMICK, of Fauquier county, in the State of Virginia, have invented, made, and applied to use a new and useful Improvement in Plows for which Letters Patent were granted on the 20th day of January, 1826, but in consequence of defects in the specification were cancelled, returned to the Patent Office, and the seal broken.

My improvement is specified in the following words, viz:

First, of the shape of the share, landside, &c. The landside or bar is made of wrought-iron, also the share, which is welded to the bar in the common way and forms the bar point and share. The bar is three inches deep at the heel and tapers off to an edge at the point. It is made one inch and a quarter thick at the bottom and about half that thickness at the top, which enables the smith to weld the share and bar together with less difficulty than if they were of the same thickness. A piece of iron or steel is welded up to the place where the point of the mold-board comes on the share from its point about half an inch thick and one inch and a half wide. This is a great protection to the mold-board, and gives strength and form to the point and share. The share is thirteen inches long, ten inches wide, and a little rounded on its edge to the point. The point is ten inches long from the point of the mold-board and about ten inches wide, and is made thin next the share side. The point is a quarter-circle, taken off on the same side. This shape enters the earth with great facility. The share has a hole three inches back from the point of the mold-board by the side of the bar, one inch and three-quarters wide and three inches long, the intention of which is to receive a catch at the bottom of the mold-board to fasten to the share. This will be more fully understood when I describe the mold-board. A screw-bolt will hold them fast, but is more liable to get out of order. A part of the bar at the heel is made thin and reaches up the beam-handle eight inches, about the center of which a hole is made for a screw-bolt to fasten them together. If a shoe or fender is applied to a cast or wrought landside, it must be countersunk, or as much must be taken out of the bottom and side as the shoe is thick. The shoe is six inches long and two and a half inches broad on the side and two inches at the bottom. The front end is made round or semi-circular. In the center is a square hole and in the bar a round one, through which passes a screw-bolt, fastening the two together. The round hole in the landside admits the shoe to lower behind as it wears off. When the shoe is let down it is made fast by a little cog or projection that is on the inner or hind part of the shoe, which fits in notches or indentations made in the landside. By this improvement the plow may be plunged deep or shallow by raising or lowering the shoe behind. The principle and form of the share, as above mentioned and described, were made by me, and patented on the 3d day of February, 1819, with the exception of the additional improvement as set forth in the latter part of this specification and designated 1, 2, 3, 4, and 5.

Second, of the general shape of the mold-board. This part of the plow is by far the most difficult which mechanics have to encounter. In the first place the share should be made as heretofore described, and placed upon a bench or plank, which must be perfectly level, the bar being parallel with its edge. Then a compass is applied, commencing where the point of the mold-board comes on the share, and terminating ten inches in right angle from the landside, measuring from the heel and bottom. With the points of the compass eighteen inches apart a circle is described, which is the shape of the lower edge of the mold-board next the share. A segment of this circle fifteen inches long is applied at the bottom of the mold-board as a guide by which to lay it off, and is the length of the bottom, measuring from the front, where it is sloped off to the upper hind end. Eleven inches of the mold-board fits on the share, and three inches back it is half an inch lower than the part which rests on the share. This gives sufficient thickness to the heel or that part of the mold-board. A suitable block of wood for the mold-board is fitted on the share and to the circle described on it. The front edge of the mold-board, from the point up to the beam, is shaped by a quadrant, or any instrument for taking altitudes, the base or foot of which is three inches long, and which, being applied up the edge, will give the following degrees of elevation, viz: The first three inches, commencing at the point, has an elevation of thirty degrees; the second three inches, thirty-six degrees; the third three inches, forty-eight degrees; the fourth three inches, sixty-five degrees; the fifth three inches, eighty-nine degrees; the remaining two and a half inches a little more than eighty-nine degrees, with a regular continuation of the elevation of the edge of the mold-board. The top edge of the mold-board runs out nearly in a straight line, but a little drooping behind. The face at or near the top edge is in a straight line running with its length, and twenty-two inches long from the front edge. The hind part is rounded off to the upper hind end, commencing fifteen inches from its point. The round does not vary more than one inch from a straight line. The hind end is eleven inches high, measuring from the plane upon which the share and mold-board stand. The extreme hind end of the mold-board to the landside is sixteen inches, measuring by a line drawn at angles to the plane of the landside. A perpendicular line is drawn on the face of the mold-board, commencing at the hind part of the share, where it rests, and terminating at the top edge. The width of this part is thirteen inches. The face is worked out to the lines above mentioned, and the quadrant applied up the perpendicular line until it gives the degrees as follows, viz: the first three inches, thirty-eight degrees; the second three inches, fifty-one degrees; the third three inches, sixty-five degrees; the fourth three inches, eighty-two degrees; the fifth three inches, ninety-five degrees, or five degrees beyond a perpendicular. The landside of the mold-board parallel with the bar is perpendicular to the plane on which the plow stands to within six inches of the beam. It then rises in a curve hanging over toward the landside one and a half inch. At the same time the front edge, within six inches of the beam, inclines a little toward its face, the object of which is to prevent its being vertical to the under part of the beam, which aids in passing off grass, &c. The object of the curves hanging over toward the landside is to place the beam as much as possible from over the body of the plow in that direction to prevent the sward and grass from choking it up between the beam and mold-board.

The front edge of the mold-board, from the point up to the beam, is made sharp, the bottom of which, that rests on the share next to the landside and contiguous to the bar, is six inches long, measuring from its point. It then forms a regular circle, approaching to within two inches of the beam, rendering the mold-board gradually thinner as it ascends to that point where it is one inch and three-quarters thick. The remaining part of two inches up to the beam extends out two inches behind. A hole is made for the beam-bolt through this part of the mold-board one inch and three-quarters long and three-quarters of an inch wide. The top is calculated for the beam to rest upon, and is four inches and a half long and three inches and three quarters wide at the middle of its length. The front comes to an edge, and the hind part is one inch and a half wide. The object of the long hole for the beam-bolt is to admit its moving to the right or left of the plow for the purpose of adjusting the beam on the top of the mold-board to give or take land for two or three horses. The height of the mold-board from the bar is thirteen and a half inches. The plan adopted to fasten the handle to the mold-board is that of a concave groove, made seven inches long, two and a half inches wide, and three-quarters of an inch deep, with a suitable inclination to receive the handle. A hole is made through about its center for a screw-bolt, which confines the handle permanently in the groove. It also gives great strength to the mold-board, and is a considerable convenience in giving the handles a proper shape where the plowman holds it. In order to make the mold-board suit all soils and the speed of the team that draws the plow, it may be contracted or expanded by the means of an iron rod, about five-eighths of an inch in diameter and eleven inches long, with a screw cut on each end, one right and the other left handed. Each end screws in the handles near the mold-board and landside, and by having a hole in its center it may be turned backward or forward, which widens or narrows the mold-board. The back of the mold-board is marked off until it is of a suitable thickness, as the judgment and fancy may direct, and should weigh, when in iron, about forty pounds. At the bottom of the mold-board is a catch, which passes through the share, and in which the latter fits. The catch is of the size of the hole in the share, and one and a half inch deep. By putting in a wedge behind the catch it keeps them both firmly together. The brace to this plow is made fast by the screw-bolt, which passes through it and fastens the landside and handle together. It then extends up to the hole through the top of the mold-board, at which place it has a shoulder, and passes through it and serves for the beam-bolt. The size of the share and mold-board, as above described, is calculated to cut and turn about fourteen inches of earth in width, and from four to six inches in thickness, with two good horses. It may be enlarged or diminished to great accuracy by making the base or foot of the quadrant longer or shorter. The principle of the mold-board, as above mentioned, was made by me previous to my patent of the 3d of February, 1819, but did not extend quite to the beam, and no particular rule was given for its formation, for which improvement see part second, hereinafter claimed.

Third, of the structure of the cast landside where it is connected to the mold-board, as above described, and where a wrought share is applied. The share is made in the same manner as above described, except that the bar does not extend farther back than the share, which is welded on the bar, say, ten inches from the point of the mold-board. It is cut off square and abuts against an offset in the landside that extends to the plane on which the plow stands. The hind part of the share is fastened by a catch on the inside of the landside, which fits in a notch made in the plate. The front of the share is supported by a catch on the bottom of the mold-board, or by a screw-bolt, as before mentioned. The hind part of the landside, where the handle is applied, has a concave groove for the handle, and is fastened with a screw-bolt. The landside is seven inches wide, and from the front of the mold-board to the heel is twenty inches. When a cast share and a self-sharpening point are used to the mold-board and landside the place where the wrought share is applied is filled up and formed to receive a cast share without a point, which comes even with the front end of the mold-board and is let in the latter its thickness, the share inclining a little down from the edge of the mold-board and fastened with a screw-bolt. A hole is made through the front part of the mold-board, between it and the landside, upon an inclined plane of from twelve to fifteen degrees, and is two inches wide and five-eighths of an inch thick. A cross-bar from the landside to the mold-board is placed fourteen inches from the front end and in a line with hole in front, which is to receive the point. The brace-bar is also of cast-iron, and is united to the landside and mold-board. The end united to the landside is two inches wide and the other one inch and a half. A hole is mode in the brace-bar for a screw-bolt to fasten the point to prevent its moving back when the plow is at work. The self-sharpening point is made of hard iron or steel, which is of the size of the hole through the front part of the mold-board, and is four feet long. In the center of the bar or point the space of one foot has holes about half an inch in diameter and three-quarters of an inch apart. The intention of these holes is to fasten the point to the cross-bar with a screw-bolt, also to advance the point when it becomes too short by use. When the point is worn to a bevel on the under side it may be turned over and give more length in front by the holes in the center, and when one end is worn out the other may be used in the same manner. The share to this plow comes a little under the point, and one supports the other. The edge of the share is a little rounded and of the usual width. Plows have been heretofore made upon the self-sharpening principle, but do not embrace the improvements claimed by me.

Fourth, of the method of stacking the plow. The beam and mold-board handles are fitted to their places as heretofore described, and made fast by a screw through each. The beam is fitted on the mold-board and on the outside of the handle, the front end of which is elevated seventeen or eighteen inches above the plane on which the plow rests. The beam is fastened to the handle by a staple of round iron half an inch in diameter, which fits around the beam and is let in nearly half its thickness and passes through the handle, with a screw-nut on each end, and which draws the two firmly together. The beam is fastened down on the top of the mold-board by a screw-bolt which passes through it. The brace bar or rod, of iron, secured into each handle between the landside and mold-board, contracts or expands the mold-board as heretofore mentioned. One cross round or brace, of wood, near the upper end of the handles, is sufficient to hold them together. The beam is six feet two inches long, five inches deep, and three and a quarter inches thick. At the beam-bolt each end is made smaller, as fancy may direct. The handles are four feet nine inches long, two and three quarters of an inch wide, and two inches thick at the lower ends and one inch and a quarter at the upper ends. The height of the handles is two feet ten inches from the plane in which the plow stands, and their width or distance apart is two feet two inches.

Fifth, the colter and sword. When the lock colter or sword is applied the best plan and the safest is to fasten it by the side of the beam with a staple of round iron that goes under or over the beam, with a screw-nut on each end, which draws the colter or sword firmly to the beam, or a stirrup that goes round the beam, with a screw-nut cut in its center opposite to the colter, in which a small screw is fitted to press against a piece of iron on the beam, which fastens the colter or sword in the same manner. The lock-colter comes in a gentle curve from the point up to the beam, corresponding with the front edge of the mold-board. The front and wearing part of the colter is made thick, and comes to an edge about six or eight inches from the bottom of the bar of the plow. The front edge of the colter being thick, with a gentle inclination, aids the mold-board in raising the sward and takes off the side pressure against the colter, which lightens the running of the plow. The sword is made straight and has two edges in the shape of the lancet. Either edge may be used. This shape enters well and prevents friction by the rise of the sward, and is useful in turf-land.

This plow is worked with double and single trees of the common kind, and is coupled to a clevis made in the common way on the end of the beam.

The improvement I claim to have invented in the foregoing specification is as follows, viz:

1. The share, &c., the bar made thick at the bottom and thin on the top edge, putting a piece from the point of the share or the plow up to the point of the mold-board, and the application of the improvement in the shoe to raise and lower behind at pleasure.

2. The method in which the mold-board is wrought, the shape of its face or mold part, the curve or projection over toward the landside, the long hole through its top for the beam-bolt, the catch at the bottom to fasten it to the share, and the concave groove for the handle.

3. The structure of the fore part of the mold-board for the cast share and the self-sharpening point, the portion of the brace-bar between the landside and mold-board for the point to rest on and to fasten to, the length of the point and the manner in which it is fastened to the brace-bar, and the shape of the share for the point to rest upon.

4. The shape of the sword with two edges, and the manner in which it is fastened to the side of the beam with a staple.

5. The stock, the method of fastening the handle and beam together with a staple, fitting the handle in the concave groove, and adjusting the beam on the top of the mold-board, all of which is fully specified in the foregoing.

In testimony that the above is a true specification or description of my said improvement on the plow as invented by me on the 3d day of February, 1819, and for which I have taken out Letters Patent of the United States, I have hereunto set my hand this 21st day of October, in the year of our Lord 1828.

STEPHEN McCORMICK.

Witnesses:

WM. ELLIOTT,

R. W. FENWICK.